June 21, 1955 C. GOODMAN 2,711,482
METHODS AND APPARATUS FOR RADIOACTIVITY WELL LOGGING
Filed Sept. 24, 1951 3 Sheets-Sheet 1

INVENTOR.
CLARK GOODMAN
BY
Campbell, Brumbaugh, Free & Graves
ATTORNEYS

INVENTOR.
CLARK GOODMAN
BY
ATTORNEYS

June 21, 1955  C. GOODMAN  2,711,482
METHODS AND APPARATUS FOR RADIOACTIVITY WELL LOGGING
Filed Sept. 24, 1951  3 Sheets-Sheet 3

INVENTOR.
CLARK GOODMAN
BY
Campbell, Brumbaugh, Free & Graves
ATTORNEYS

United States Patent Office 2,711,482
Patented June 21, 1955

2,711,482

METHODS AND APPARATUS FOR RADIO-ACTIVITY WELL LOGGING

Clark Goodman, Boston, Mass., assignor to Schlumberger Well Surveying Corporation, Houston, Tex., a corporation of Delaware Application September 24, 1951, Serial No. 247,978

18 Claims. (Cl. 250—77)

The present invention relates to methods and apparatus for radioactivity well logging and more particularly to novel methods and apparatus for obtaining indications of radioactive radiations emitted by, induced in, or scattered by the formations traversed by a borehole and/or by the fluid contained in said borehole.

In present oil field practice, it is quite usual to obtain indications of the radioactive properties of formations traversed by a borehole by passing one or more radioactivity detectors of the desired response characteristic through a cased or uncased borehole and measuring a function of the output of the detector or detectors, correlated with depth. Due to the extreme pressures prevailing in boreholes it has been necessary heretofore to protect the sensitive radioactivity detectors by placing them in a relatively thick pressure-resistant housing, usually constructed of steel. Accordingly, much of the radiation, natural, induced or scattered, that it is desired to detect, is shielded from the detectors, thus greatly reducing the sensitivity of the system. In fact heretofore it has been impossible to detect certain easily absorbed radiations, such as alpha rays, beta rays, soft X-rays, or low energy gamma rays, since the steel housing stops substantially all of such radiations.

It is a primary object of the invention to provide novel methods and apparatus for logging radioactivity in a borehole wherein the radioactivity responsive device is substantially directly exposed to the radiation to be detected.

Another object of the invention is to provide methods and apparatus for radioactivity logging of boreholes wherein the overall sensitivity of the system is increased.

Still another object of the invention is to provide methods and apparatus for detecting easily absorbed radioactivity radiations, such as alpha rays, beta rays, soft X-rays, or low energy gamma rays emanating from, induced in, or scattered through the fluid in or the formations traversed by a borehole.

These and other objects of the invention are attained by exposing directly to the desired radiation in a borehole one or more so-called scintillation elements which emit light when exposed to radioactivity. The scintillation element or elements are constructed of such shape and size and of such material as to give a light response to the type of radiation desired to be detected. Suitable scintillation materials are, for example, anthracene or naphthalene, which are in the form of solid crystals and are thus unaffected by the pressure in the borehole. If such organic crystals which are also unaffected by moisture are employed, the fluid in the borehole will not destroy their radioactivity detecting properties. The scintillation element or elements are placed outside a pressure resistant housing and the light emitted therefrom is transmitted through a transparent, pressure-resistant window in the housing to one or more photosensitive devices protected within the housing. The electrical output from the photosensitive device or devices may be detected, and recorded at the surface of the earth in any conventional manner.

The scintillation elements in accordance with the invention may be exposed directly to the fluid in the borehole or may be pressed either against the formations through the mud cake if any, or may be pressed against the mud cake.

The invention will be more fully understood after considering the following detailed description of several representative embodiments, taken in conjunction with the accompanying drawings in which.

Figure 1:
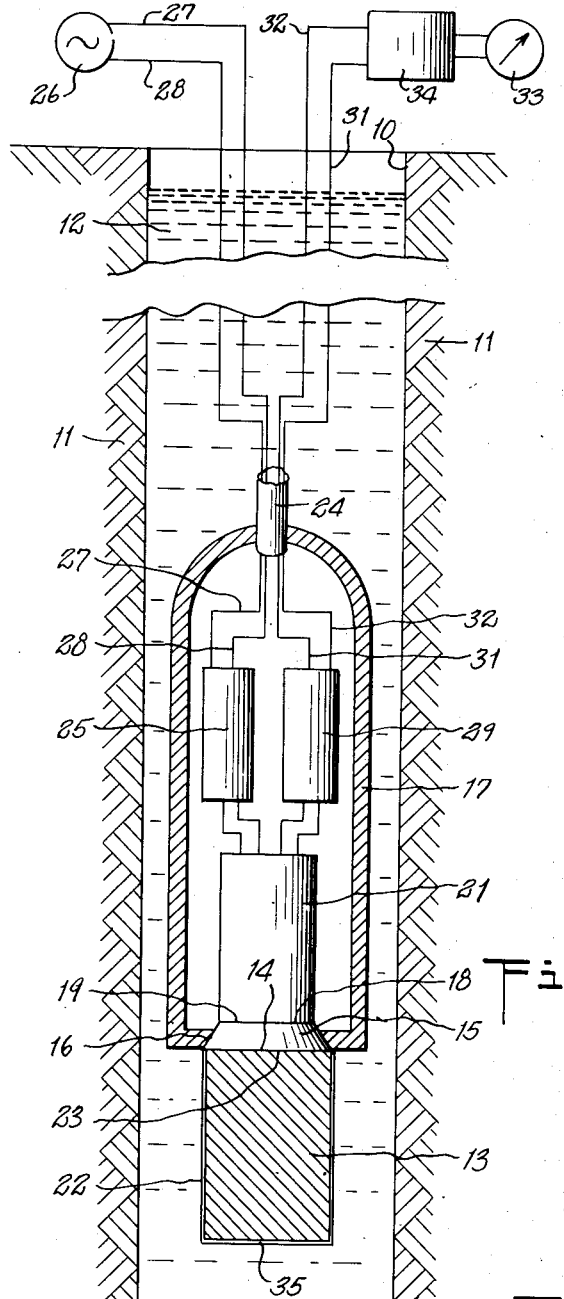
Figure 1 is a schematic drawing showing radioactivity well logging apparatus employing a scintillation element directly exposed to the pressure of the fluid in a borehole and serving to respond to weak radioactive radiation.

In Figure 1, a conventional borehole 10 is shown traversing earth formations 11. This borehole may be dry or filled with fluid 12 as shown, and may be cased with pipe or uncased as shown. A scintillation element 13, which is preferably cylindrical in shape, is suspended in the borehole 10 in direct contact with fluid 12. Element 13 is attached or fitted next to the exterior face 14 of a window 15 placed in an opening 16 in the base of a pressure-resistant housing 17. Between the window 15, which may be made from quartz, and housing 17 are placed washers or O-rings (not shown) to maintain the interior of housing 17 pressure resistant. Opposite the interior face 18 of window 15 is placed the photosensitive element 19 of a conventional phototube 21. When radioactive radiation from fluid 12 or formations 11 strikes scintillation element 13, a burst of light is emitted thereby. Some of this light is transmitted through window 15 to photosensitive element 19 of phototube 21. Phototube 21 converts light impulses into electrical impulses, which are a function of the radiation creating the light impulses and are readily measured and recorded.

In order to increase the efficiency of the detecting system, a thin reflective coating 22, such as aluminum, may be placed around all but the surface 23 of scintillation element 13 adjacent window 15. This reflective coating 22 increases the amount of light directed towards the photosensitive element 19 of phototube 21. Coating 22 may be placed, for example, on scintillation element 13 by sputtering, or may be wrapped securely about element 13 in the form of a foil. The reflective coating 22 is preferably opaque to light so that any fluorescence present outside of scintillation element 13 is shielded from the phototube 21. The coating must be so thin, as for example 1/1000 of an inch thick aluminum foil, that the radiation to be detected is not absorbed thereby. The efficiency of the system may be further increased if window 15, which is transparent to the light frequencies generated in element 13, is manufactured from material having substantially the same index of refraction as the material forming scintillation element 13.

As shown in Figure 1, housing 17 is raised and lowered through borehole 10 by means of a conventional electrical cable 24. The various voltages necessary to operate phototube 21 may be supplied by a high voltage source 25 either at the surface of the earth or in housing 17 as shown. The energy to operate high voltage source 25 is supplied from an alternating voltage source 26 through conductors 27 and 28 contained in cable 24. The pulse output of phototube 21 is preferably amplified by an amplifier 29 within housing 17 and the amplified pulses transmitted to the surface through conductors 31 and 32 in cable 24. Preferably amplifier 29 is so biased that most of the so-called "dark" pulses from phototube 21 are not amplified. The pulses from phototube 21 are recorded or indicated directly by a meter 33. The pulses are preferably integrated by an integrating circuit 34 and then recorded as a smooth curve by meter 33 as a function of the depth of housing 17 in the borehole according to the usual practice. To eliminate cable distortion, circuit 34 may be placed in housing 17.

Phototube 21 may be an R. C. A. type 5819 photoelectric multiplier with the photosensitive element 19 at one end thereof. Alternatively, phototube 21 may be an R. C. A. type 931 photoelectric multipler having its photosensitive element in the side thereof, though for the embodiment shown in Figure 1, the former type of phototube having a sensitive element in one end is preferred since it may be more readily placed along the longitudinal axis of housing 17.

Scintillation element 13 may be made into a directional detector by, for example, shielding the base 35 thereof with a lead shield (not shown). When thus shielded element 13 will detect radiation coming substantially only from a radial direction, eliminating a great deal of the radiation emanating from borehole fluid 12. Alternatively, element 13 may be made more sensitive to radiation originating from the borehole fluid by shielding the cylindrical portions thereof, so that radiation can enter the element substantially only through base 35. Other shielding arrangements will suggest themselves to those skilled in the art.

The device shown in Figure 1 is particularly adapted to detect natural gamma radiation emanating from the formations. Thus meter 33 will record a highly sensitive, natural gamma radiation log which includes indications of low energy or degraded gamma rays heretofore unobservable in boreholes because of the shielding effect of the pressure-resistant housing required to protect conventional detectors. If it is desired, for example, to obtain a so-called "neutron-gamma ray" log or a "gamma ray-gamma ray" log, a suitable source of neutrons or gamma rays (not shown) may be placed in housing 17 above scintillation element 13.

The element 13 shown in Figure 1 may be readily modified to obtain a neutron log. For the detection of fast neutrons, by means of recoil protons, for example, a material containing hydrogen may be placed around scintillation element 13 or incorporated in element 13 during its manufacture if a non-hydrogenous scintillation material is used. For the detection of thermal-neutrons, a boron compound, for example, may be placed around scintillation element 13 or incorporated therein. This will give a neutron log. If it is desired to obtain a "neutron-neutron" log or a "gamma ray-neutron" log, a suitable source of neutrons or gamma rays, respectively, may be placed within housing 17 above scintillation element 13. Thus, the apparatus in Figure 1 provides an excellent means for obtaining any of the usual radioactivity logs.

The apparatus shown in Figure 1 is readily modified to obtain selective indications of easily absorbed radiations. A relatively large scintillation element 13 responds to the easily absorbed alpha rays, beta rays and soft X-rays, but its response to gamma radiation is so much greater that the less penetrating radiation has little relative effect on the pulse output. If, on the other hand, scintillation element 13 is made very thin, for example, if its length $l$ is in the approximate range of one to two millimeters, element 13 will respond primarily to alpha or beta radiation emanating from borehole fluid 12, since more penetrating radiation will not give any substantial response in such a thin layer. By selecting the proper thickness for reflective coating 22, the scintillation element 13 may be made to respond primarily to either alpha or beta rays depending on the thickness selected. If the length $l$ is made longer but less than one-half an inch, for example, the sensitivity of scintillation element 13 to X-rays is greatly increased. Thus, the apparatus in Figure 1 may be made responsive to natural alpha, beta or X-ray radiation, or may, by the use of a suitable radiation source, be made responsive to induced or scattered easily absorbed radiation.

Figure 2:
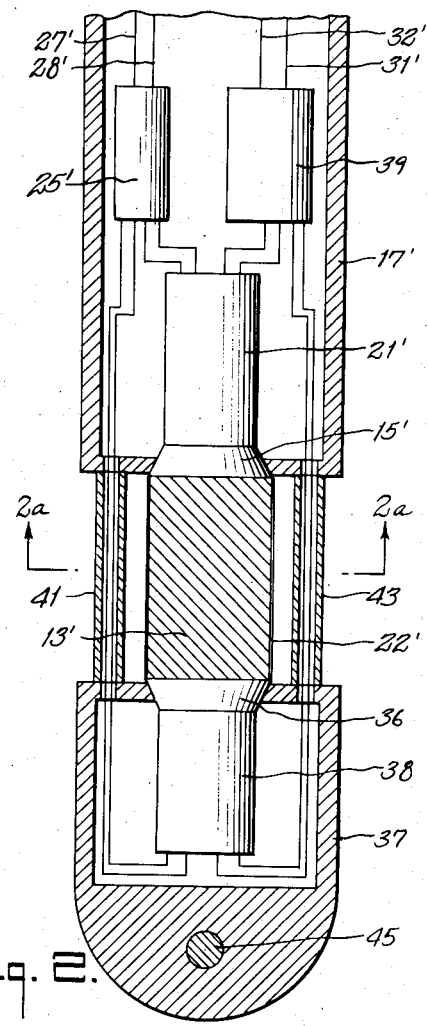
Figure 2 is a modification of the invention as shown in Figure 1 whereby the electrical circuit is less sensitive to "dark" pulses originating in the photosensitive elements used to detect light from a scintillation material.

Referring now to Figure 2 there is shown apparatus wherein the effect of the so-called "dark" pulses generated by phototubes is reduced and the sensitivity thereby increased as compared to the apparatus of Figure 1. In Figure 2, as in Figure 1, a scintillation element 13' is placed next to a transparent window 15' mounted in the wall of a pressure-resistant housing 17'. The photosensitive element of a phototube 21' is placed opposite the interior face of window 15'. However, at the other end of scintillation element 13' there is placed a second window 36 opening into a housing 37. A second phototube 38 is contained within housing 37 with its photosensitive element exposed to the window 36. Phototubes 21' and 38 obtain their necessary operating voltages from a high voltage source 25'.

When a burst of light is emitted from within scintillation element 13' as a result of radioactive bombardment, the light is transmitted through windows 15' and 36 to the photosensitive elements of phototubes 21' and 38 respectively. The outputs of these two tubes are fed to a conventional pulse coincidence circuit 39. As is well known, such a circuit only generates a pulse when two controlling pulses are simultaneously supplied thereto. The pulses resulting from coincidences of two pulses from phototubes 21' and 38 are transmitted to the surface by means of conductors 31' and 32' and recorded similarly to the pulses generated in the apparatus of Figure 1. Thus it can be readily understood that the "dark" pulses emitted at random by phototubes 21' and 38 will not be recorded as fictitious radioactivity.

Figure 2A:
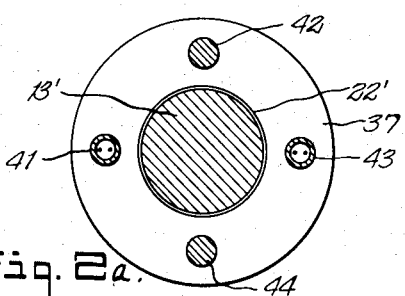
Figure 2A is a cross section of Figure 2 taken through the dashed line 2A—2A and looking in the direction of the arrows.

The actual physical construction of the housings 17' and 37 may take many shapes. For example, lower housing 37 may be connected to housing 17' by means of a plurality of connecting struts 41, 42, 43 and 44. As shown in Figure 2A, these struts do not appreciably shield scintillation element 13' from radioactive bombardment but offer substantial support for housing 37 so that no stresses or strains are placed on scintillation element 13. If desired, several of the connecting struts, say struts 41 and 43, may be hollow in order that the conductors to and from high voltage source 25' and coincidence circuit 19, respectively, may pass from the upper housing 17' to the lower housing 37.

As indicated in connection with Figure 1, this device may be used for making a natural gamma ray, neutron, alpha ray, beta ray or X-ray log, or may be used, for example, to obtain a "gamma ray-gamma ray," "neutron-neutron," or "gamma ray-neutron, or neutron-gamma ray" log. To this end a suitable radioactivity source 45 may be placed within the lower housing 37.

Figure 3:
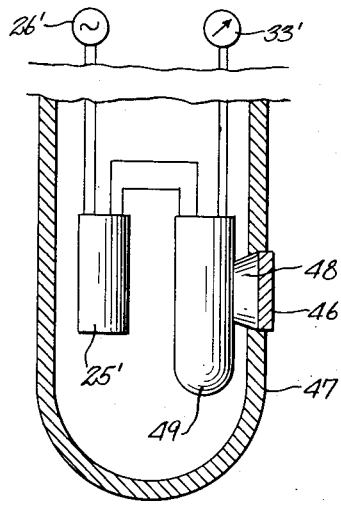
Figure 3 is a form of the invention which gives somewhat directional radioactivity indications.

The apparatus shown in Figure 3 provides a more directional radioactivity log. A disk-shaped scintillation element 46 is placed on the exterior of a pressure-resistant housing 47. A transparent pressure-resistant window 48 permits light from scintillation element 46 to pass into housing 47 to a phototube 49. In this embodiment the phototube is preferably one having its photo-sensitive element in one side thereof, as for example, an R. C. A. type 931 photoelectric multiplier tube. Thus scintillation element 46 is responsive substantially only to radiation emanating from a direction perpendicular to its face. As discussed above, scintillation material 46 may be made to respond primarily to neutrons, gamma rays, alpha rays, beta rays, or X-rays, as desired.

Figure 4:
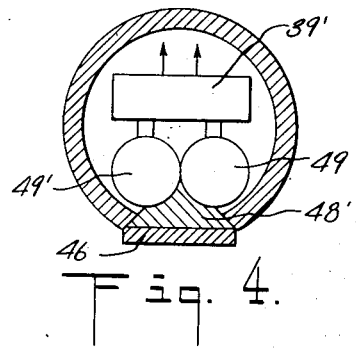
Figure 4 is a modification of the embodiment shown in Figure 3 adapted to reduce the sensitivity to "dark" pulses.

By use of coincidence circuits similar to those shown in Figure 2, the detecting apparatus shown in Figure 3 may be made less responsive to "dark" pulses and thus have greater sensitivity. Accordingly, Figure 4 shows in cross-section phototubes 49 and 49' having their respective photosensitive elements directed towards scintillation element 46. The pulse outputs of tubes 49 and 49' are fed to a coincidence circuit 39', the output of which is then transmitted to the surface for recording. Window 48' is preferably so shaped as to fit snugly against scintillation element 46 and phototubes 49 and 49', as shown in Figure 4.

Figure 5:
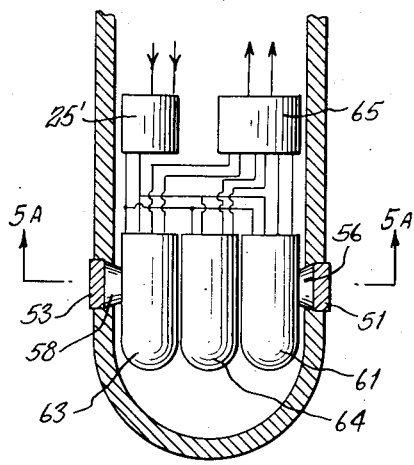
Figure 5 is a modification of the invention for obtaining a plurality of directional indications or highly sensitive measurements of radioactivity or a plurality of different types of radioactivity indications at the same level in a borehole.
Figure 5A:
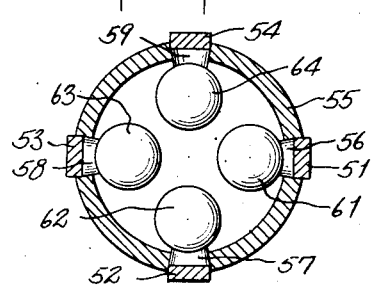
Figure 5A is a cross section of Figure 5 taken through the dashed line 5A—5A and looking in the direction of the arrows.

Figure 5 illustrates apparatus arranged for an even more accurate radioactivity log by employing a plurality of scintillation elements 51, 52, 53, and 54 disposed radially about a housing 55. An equal number of windows 56, 57, 58 and 59 permit light pulses to pass from the respective scintillation elements to the interior of housing 55. Opposite each window, as shown in Figure 5A, is placed the photosensitive element of one of phototubes 61, 62, 63 and 64, respectively. The outputs of these phototubes may be fed to an amplifier 65 for combining and transmitting to the surface. Of course, a pair of phototubes may be placed opposite each window in the manner shown in Figure 4. In such a case the outputs of the phototubes opposite each window would be fed to separate coincidence circuits before being supplied to combining amplifier 65.

Alternatively, each scintillation element may be designed to respond primarily to a different type of radiation, and the responses separately detected, amplified and recorded. Thus, means may be provided for obtaining a plurality of different types of radioactivity logs from the same levels in a borehole. If three or more scintillation elements having the same response characteristics are employed, and the indications obtained from each sent separately to the surface for separate recording, this log can be used to determine the dip of the strata, for example, in a manner well known in the art.

Figure 6:
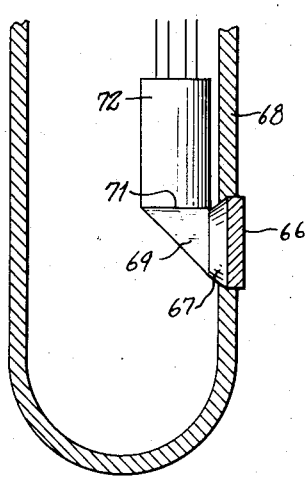
Figure 6 is a modification of the embodiment shown in Figure 3.

As a result of the cylindrical shape of the housing employed in boreholes, the embodiments of the invention shown in Figures 3, 4 and 5 are particularly adapted to use phototubes, such as R. C. A. type 931 photoelectric multipliers, having their photosensitive elements in the side thereof. However, any of these embodiments may be readily modified to use phototubes having their photosensitive elements in one end thereof, as shown for example in Figure 6. In Figure 6 a scintillation element 66 transmits light through a window 67 in the side of a housing 68. However, the light, instead of falling directly on one or more phototubes, is reflected upwardly or downwardly by means of a prism 69 and thence to the photosensitive end 71 of a phototube 72.

The embodiments shown in Figures 3, 4 and 5 are adapted to detect natural radiations from only one common variable level in a borehole. It is, of course, understood that by disposing a plurality of scintillation elements along the axis of the borehole with additional amplifying circuits for each, a plurality of separate natural radioactivity indications may be obtained simultaneously. At each location one or more different types of natural radiations may be detected. Alternatively, at one or more locations natural radiation may be detected, and at the other locations induced or scattered radiations may be detected by employing a suitable source or sources of radioactivity in association with the scintillation elements at the different locations.

The embodiments shown in Figures 1 through 6, inclusive, obtain indications which are affected to some extent by the presence of fluid in the borehole. Thus, for example, in these embodiments, if it is desired to detect easily absorbed radiations, such radiations will be detected only in the event that the radiation emanates from the borehole fluid since the borehole fluid will substantially shield the scintillation element or elements from the formations. If it is desired to eliminate the effect of the borehole fluid, the embodiment shown in Figure 7 may be employed.

Figure 7:
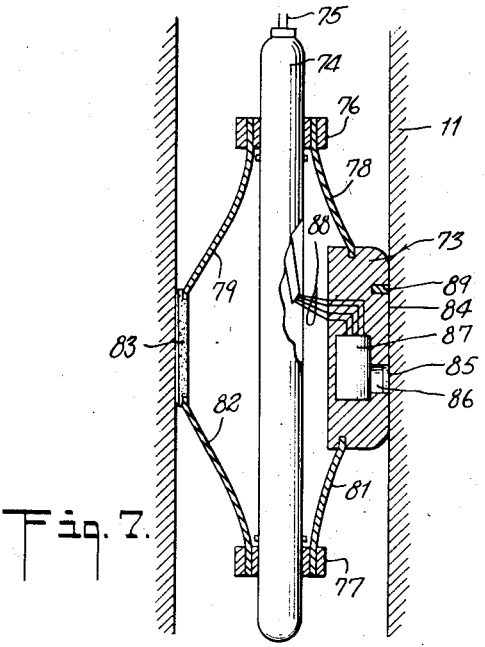
Figure 7 is another form of the invention for obtaining radioactivity indications along the wall of the borehole.

In Figure 7 a pad 73 is pressed continuously along the wall of the borehole or along the interior of a casing, if any. Pad 73 may be maintained in place by a spring arrangement such as shown in application Serial No. 122,102, filed October 18, 1949, which matured on February 16, 1954, as U. S. Patent No. 2,669,690, for "Resistivity Method and Apparatus for Obtaining Indications of Permeable Formations Traversed by a Bore Hole," by H. G. Doll. A housing 74 is suspended from the surface by an electrical cable 75. One of a pair of sliding sleeves 76 and 77 is mounted near each end of housing 74. Sleeve 76 supports one end of leaf springs 78 and 79 on opposite sides of housing 74 while sleeve 77 supports one end of similar leaf springs 81 and 82. The unsupported ends of springs 78 and 81 are attached to pad 73 and cooperate to force it against formation 11. The unsupported ends of springs 79 and 82 are connected to a centralizing pad 83 which acts to maintain the housing 74 centered in the borehole. Thus, as housing 74 is passed through the borehole, outer surface 84 of pad 73 is maintained in contact with the formation 11. In this embodiment the pad 73 and springs are so designed that surface 84 will slide freely along the wall of the borehole but will not appreciably penetrate any mud cake that may be present opposite permeable formations.

A scintillation element 85 is placed at the surface 84 of pad 73 in direct contact with the wall of the borehole. A window 86 in pad 73 permits light pulses from scintillation element 85 to pass to a phototube 87 mounted within the pad 73. The operating voltages and the output pulses are transmitted between phototube 87 and housing 74 by a plurality of insulated conductors 88. Within housing 74 is placed the necessary electronic equipment, connected to conductors 88, to operate phototube 87 and to utilize the pulse output thereof.

As scintillation element 85 is passed along the wall of the borehole, indications will be obtained of the radiation emanating from the formations or the mud cake. If scintillation element 85 is made extremely thin so as to detect beta radiation or X-rays, for example, the log obtained will indicate the beta radiation or the X-rays, respectively, emanating from either impervious formations or from the mud cake present on permeable formations.

The fluid in the borehole may have been previously treated with particles which emit soft radiations. Then as the housing 74 is passed through the borehole opposite an impermeable formation, substantially no indication will be obtained. However, when housing 74 passes a permeable formation on which a mud cake has formed containing the radioactive material, a strong indication will be obtained. Thus, the invention provides a highly effective means for locating permeable formations.

In a preferred form of the invention, a local source 89 of radioactive radiation, such as neutrons or gamma rays, is placed in pad 73 so as to be exposed directly to the formation 11 through face 84. If a source is employed, pad 73 must be made from suitable shielding material to prevent radiation passing directly to scintillation element 85. If source 89 emits beta rays or soft X-rays, the source is placed as close to scintillation element 85 as possible leaving only a thin shield between the source and the scintillation element. Thus a highly effective induced or scattered "soft" radiation log is obtained of the wall of the borehole.

As mentioned above, pad 73 in Figure 7 is adapted to slide along the wall of the borehole so as not to penetrate any mud cake that may be present on permeable formations. If, on the other hand, it is desired to obtain a log of the formations, excluding the effect of any fluid present in the borehole or the mud cake on permeable formations, the embodiment shown in Figure 8 may be employed.

Figure 8:
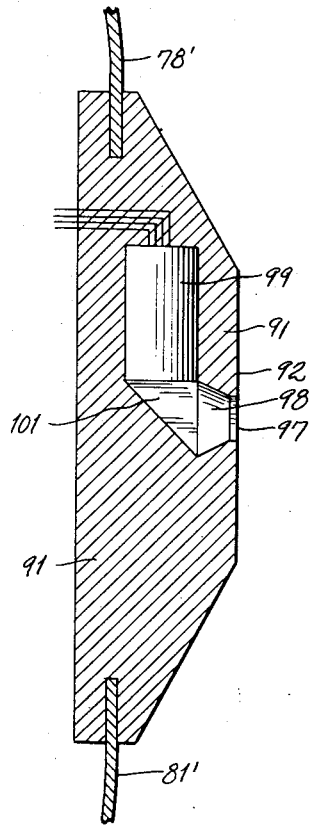
Figure 8 is a modification of the embodiment shown in Figure 7.
Figure 8A:
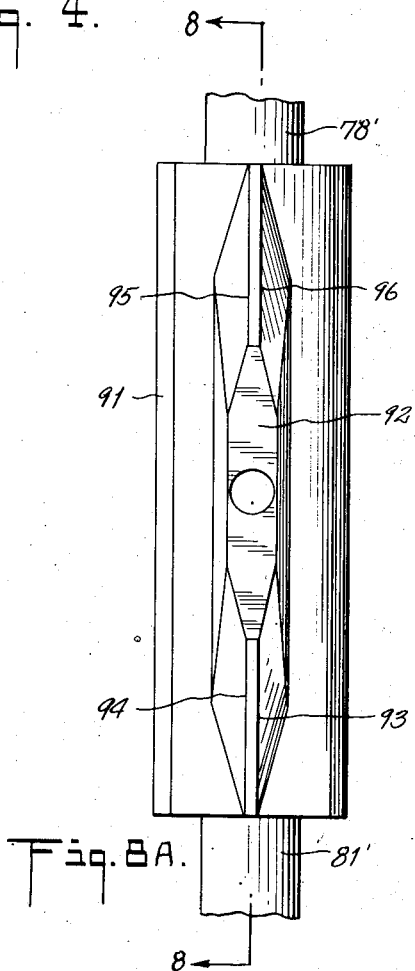
Figure 8A is a side view of the modification shown in Figure 8.

In Figure 8 a pad 91 is maintained against the wall of the borehole by springs 78' and 81' in a manner similar to the maintenance of pad 73 in Figure 7. However, the outer surface 92 of pad 91 is adapted to cut through any mud cake that may be present on the wall of the borehole. This pad, for example, may be similar to the pad shown in application Serial No. 248,620, filed September 27, 1951, for "Differential Pressure Logging" by H. G. Doll. A plurality of sharp edges 93, 94, 95 and 96 cut through any mud cake that may be present on the wall of the borehole allowing surface 92 to be maintained against the formations, as shown in Figure 8A.

Flush with surface 92 is placed at least one scintillation element 97 exposed through a window 98 to a phototube 99. If the tube is placed vertically as shown in Figure 8, a reflecting prism 101 is employed to transmit light from scintillation element 97 through window 98 to phototube 99. Scintillation element 97 may be so constructed as to respond primarily to any desired radiation. If it is made very thin, for example, easily absorbed radiations may be detected. Since face 92 is maintained continuously against the formations, means are provided for obtaining a heretofore unobtainable alpha-ray, beta-ray or X-ray log of the formations.

A source of radioactive radiation may be employed with the apparatus shown in Figure 8, by placing a source of the desired radiation in the surface 92 shielded from scintillation element 97. Thus means are provided for obtaining a "neutron-gamma ray," "neutron-neutron," "gamma ray-neutron," or "gamma ray-gamma ray" log of formations which is substantially unaffected by the mud in the borehole. Furthermore induced or scattered beta-ray or X-ray logs may be made of the formations.

As indicated above, the scintillation elements which are most suited for the various embodiments of the invention are of the organic type, for example, anthracene or naphthalene, since they are not adversely affected by moisture. If, however, the scintillation elements are completely sealed from the fluid by a thin protective shield and cemented to the transparent windows with waterproof cement, more hygroscopic crystals, such as sodium iodide or lithium iodide, for example, can be employed. These latter crystals give substantially larger light pulses than organic scintillators, and thus offer a distinct advantage when detecting the more "energetic" types of radiation. However, when detecting weak radiation, they are not preferred since even the thin protective shield stops most of such weak radiation.

It must be kept in mind that although the preceding description has dealt with various more or less specific embodiments, the present invention, more generally, contemplates employing a scintillation element as a liason element between radioactive radiation and indicating equipment which must be protected from the fluid pressure present in a borehole. Accordingly, the appended claims are to be construed with this concept in view rather than as limited to the illustrated forms of the invention.

What is claimed is:

1. Radioactivity well logging apparatus comprising a scintillation element adapted to be directly exposed to the pressure of liquid in a borehole, means for converting light emitted from the scintillation material in response to radioactive radiation into electrical signals, and means for transmitting the electrical signals out of the borehole.

2. Radioactivity well logging apparatus comprising a pressure-resistant container having a transparent window, a photoelectric device within said container having a photosensitive element exposed to the window, and a scintillation element exterior of said container and visible through said window.

3. Radioactivity well logging apparatus comprising a pressure-resistant container having a transparent window, a photoelectric device within said container exposed to the window, a scintillation element exterior of said container and visible through the window, and a reflective coating covering at least a portion of the exterior surface of the scintillation element for reflecting light generated within said element toward the window in said container.

4. Radioactivity well logging apparatus comprising a pressure-resistant container having a transparent window, a photoelectric device within said container exposed to the window, a scintillation element exterior of said container and visible through the window, and a source of radioactive radiation mounted in said container and shielded from said scintillation element.

5. Radioactivity well logging apparatus comprising a pressure-resistant container having a transparent window, a photoelectric device within said container exposed to the window, a scintillation element exterior of said container and visible through the window, and means for pressing said container against the wall of the well to substantially eliminate the radioactivity shielding effect of any liquid in the well.

6. Radioactivity well logging apparatus comprising a generally cylindrical housing adapted to withstand the pressure of liquid in a borehole, a pressure-resistant transparent window in the surface of said housing, a photoelectric circuit within said housing responsive to light entering said window, and a scintillation element exterior of said housing and visible through said window.

7. Radioactivity well logging apparatus comprising a generally cylindrical housing adapted to withstand the pressure of the liquid in a borehole, a pressure-resistant transparent window in the surface of said housing, a photoelectric circuit within said housing having photosensitive portions thereof exposed to said window, a scintillation element exterior of said housing and visible through said window, said scintillation element having a generally cylindrical shape and being mounted substantially on the longitudinal axis of the housing with one end of said element adjacent said window.

8. Radioactivity well logging apparatus comprising a generally cylindrical housing adapted to withstand the pressure of the liquid in a borehole, a pressure-resistant transparent window in the surface of said housing, a photoelectric circuit within said housing having photosensitive portions thereof exposed to said window, a scintillation element exterior of said housing and visible through said window, said photoelectric circuit comprising a pair of photosensitive devices connected to a pulse coincidence circuit for responding only when said photosensitive devices are simultaneously actuated.

9. Radioactivity well logging apparatus comprising two spaced generally cylindrical housings adapted to withstand the pressure of the liquid in a borehole, a pressure-resistant transparent window in adjacent ends of each housing, a photoelectric device within each housing having photosensitive portions thereof exposed to the respective window, a scintillation element exterior of said housings and mounted between said windows, and a pulse coincidence circuit for responding only when said photoelectric devices are simultaneously actuated.

10. Radioactivity well logging apparatus according to claim 9 wherein the scintillation element is generally cylindrical in shape and is mounted with its ends substantially flush with the windows in the housings.

11. Radioactivity well logging apparatus according to claim 10 including a reflective coating covering at least a portion of the exterior surface of the scintillation element for reflecting light generated within said element toward the windows in the housings.

12. Radioactivity well logging apparatus according to claim 10 including a source of radioactive radiation mounted in one of the housings and shielded from the scintillation element.

13. Radioactivity well logging apparatus comprising a pressure-resistant pad having a transparent window in the outer wall thereof, a photoelectric device within said pad and exposed to the window, a scintillation element on the outside of said pad and visible through the window, and means for forcing said element into close proximity with the wall of the borehole.

14. Radioactivity well logging apparatus according to claim 13 including a source of radioactive radiation mounted in said pad and shielded from the scintillation element.

15. A method of radioactivity well logging comprising moving through the borehole scintillation material that is exposed directly to the pressure of liquid in the borehole, converting light emitted from the scintillation material in response to radioactive radiation into electrical signals, and transmitting the electrical signals out of the borehole.

16. A method of radioactivity well logging according to claim 15 including the step of radioactively irradiating the borehole in the vicinity of the scintillation material as the same is being moved.

17. A method of radioactivity well logging according to claim 15 including the step of circulating radioactive liquid mud in the borehole.

18. A method of radioactivity well logging comprising exposing scintillation material directly to the pressure of fluid in a borehole, transmitting light emitted from the scintillation material in response to radioactive radiation to a photoelectric device, and transmitting the electrical response of the photoelectric device out of the borehole.

References Cited in the file of this patent

UNITED STATES PATENTS

| | | |
|---|---|---|
| 2,133,776 | Bender | Oct. 18, 1938 |
| 2,339,129 | Albertson | Jan. 11, 1944 |
| 2,351,028 | Fearon | June 13, 1944 |
| 2,384,840 | Krasnow et al. | Sept. 18, 1945 |
| 2,469,461 | Russell | May 10, 1949 |
| 2,588,210 | Crisman | Mar. 4, 1952 |

OTHER REFERENCES

"The Scintill Counter," for Proceedings of the I. R. E., vol. 37, No. 6, June 1949, pp. 675, 676.